US008265173B2

(12) United States Patent
Grewe

(10) Patent No.: US 8,265,173 B2
(45) Date of Patent: Sep. 11, 2012

(54) METHOD FOR COMPRESSION AND EXPANSION OF ANALOGUE SIGNALS

(75) Inventor: Reinhold Grewe, Oberuhldingen (DE)

(73) Assignee: EADS Deutschland GmbH, Ottobrunn (DE)

( * ) Notice: Subject to any disclaimer, the term of this patent is extended or adjusted under 35 U.S.C. 154(b) by 1077 days.

(21) Appl. No.: 12/130,348

(22) Filed: May 30, 2008

(65) Prior Publication Data

US 2008/0304575 A1 Dec. 11, 2008

(30) Foreign Application Priority Data

Jun. 1, 2007 (EP) .................................... 07010842

(51) Int. Cl.
*H04B 1/66* (2006.01)
*H04B 14/04* (2006.01)
*G10L 19/00* (2006.01)

(52) U.S. Cl. ......... 375/241; 375/240; 375/242; 704/500

(58) Field of Classification Search ........................ None
See application file for complete search history.

(56) References Cited

U.S. PATENT DOCUMENTS 4,680,797 A 7/1987 Benke
5,600,316 A 2/1997 Moll
6,638,217 B1 * 10/2003 Liberman ..................... 600/300
6,950,772 B1 * 9/2005 Callway ........................ 702/120
2003/0071746 A1 * 4/2003 Koyanagi ........................ 341/60
2003/0088404 A1 * 5/2003 Koyanagi ...................... 704/215
2003/0216925 A1 * 11/2003 Koyanagi ...................... 704/500
2003/0220801 A1 * 11/2003 Spurrier ........................ 704/503
2007/0011514 A1 * 1/2007 Vranken et al. .............. 714/724

FOREIGN PATENT DOCUMENTS

EP 1 367 724 A1 12/2003

OTHER PUBLICATIONS

Ababii Victor et al., Conference Article, XP-002457021, May 3-7, 2004, vol. 5822, 1 pg.
Jae Yeol Rheem et al., "A nonuniform sampling method of speech signal and its application to speech coding", Signal Processing 41 (1995), pp. 43-48.
Communication dated Nov. 8, 2007, with European Search Report dated Oct. 30, 2007 (2 pages), and annexes (5 pages) relating to European Application 07010842.8.

* cited by examiner

*Primary Examiner* — Gary Mui
*Assistant Examiner* — Hicham Foud
(74) *Attorney, Agent, or Firm* — Crowell & Moring LLP

(57) ABSTRACT

In an analog signal compression method with digital compression and digital expansion of linear based or sine-based linear signals, a signal coordination point is determined in a bi-adaptive scaleable mV/step and a time/step structured plane. To accomplish this, the linear or sine-based input signal is digitized, the breaks of the digitized linear or sine-based signal are detected, and the time difference and the amplitude difference of two successive breaks of the linear or sine-based signal are determined. This permits time differences and amplitude differences of successive breaks to be value coded as a data word on the basis of adaptive scaleable time-per-step tables and voltage-per-step tables so that the time-per-step tables and the voltage-per-step tables are selected depending on the absolute value of the determined time difference and amplitude difference, thus producing compressed data. An associated expansion method for reconstructing the original analog signal is also disclosed.

7 Claims, 16 Drawing Sheets

| Step # | Time in uS |
|---|---|
| 1 | 100 |
| 2 | 200 |
| 3 | 300 |
| ⋮ | ⋮ |
| 5 | 500 |
| 6 | 600 |
| ⋮ | ⋮ |
| 9 | 900 |
| 10 | 1000 |
| 11 | 1100 |
| ⋮ | ⋮ |
| 16 | 1600 |

| Step # | Peak to Peak Difference in mV |
|---|---|
| 1 | 100 |
| 2 | 200 |
| 3 | 300 |
| ⋮ | ⋮ |
| 5 | 500 |
| 6 | 600 |
| ⋮ | ⋮ |
| 9 | 900 |
| 10 | 1000 |
| 11 | 1100 |
| ⋮ | ⋮ |
| 16 | 1600 |

cmd / data cmd = 1 data = 0 t = time steps (set to 100uS per step)

word1 = 10 x 100 uS = 1000 uS
word2 = 10 x 100 uS = 1000 uS
word3 = 10 x 100 uS = 1000 uS
} 2000 uS / 500 Hz v = mV steps (set to 100mV per step)

word1 = 10 x 100 mV = 1000 mV
word2 = 10 x 100 mV = 1000 mV
word3 = 10 x 100 mV = 1000 mV
} 1000 mV linear based digital signal code

2000 uS / 500 Hz

| | cmd/data | time/step code | hex | decimal | mV/step code | hex | decimal |
|---|---|---|---|---|---|---|---|
| declaration | d | t t t t | | | v v v v | | |
| data word 1 | 0 | 1 0 1 0 | a | 10 | 1 0 1 0 | a | 10 |
| data word 2 | 0 | 1 0 1 0 | a | 10 | 1 0 1 0 | a | 10 |
| data word 3 | 0 | 1 0 1 0 | a | 10 | 1 0 1 0 | a | 10 |
| | 0=data | 10 x 100 uS | hex | dec | 10 x 100 mV | hex | dec |

cmd / data cmd = 1 data = 0 t = time steps (set to 100uS per step)

word1 = 10 x 100 uS = 1000 uS
word2 = 10 x 100 uS = 1000 uS
word3 = 10 x 100 uS = 1000 uS v = mV steps (set to 100mV per step)

word1 = 10 x 100 mV = 1000 mV
word2 = 10 x 100 mV = 1000 mV
word3 = 10 x 100 mV = 1000 mV

Fig. 10a

METHOD FOR COMPRESSION AND EXPANSION OF ANALOGUE SIGNALS

This application claims the priority of European Patent Application 07 010 842.8, filed Jun. 1, 2007, the entire disclosure of which is incorporated herein by reference.

BACKGROUND AND SUMMARY OF THE INVENTION

This invention relates to methods for digital compression and digital expansion of linear based or sine-based signals (e.g. audio or other signal types) by determination of a signal coordination point in a bi-adaptive scaleable mV/step and a time/step structured plane.

The general principle of digital signal data flow will be described with reference to FIG. 1. Transporting the input signal information via satellite, or storing the input signal information in memory, requires an "analogue," or analog, signal source c1 (analog transducer signal, e.g. output of an analog strain measurement or an analog sine-based signal source (e.g. audio from a microphone output), which will be transferred at d1 to the signal coder c2 (signal digitizing, compression) and back to a signal decoder c3 (signal decompression and analogizing), and to an analog signal output c4 (e.g. fed to an amplifier and a loudspeaker—not shown).

For all applications, it is important to transfer a maximum signal quality at a minimum data rate.

An object of this invention is to create a method for compression and expansion of linear based analog signals (e.g. non-audio based signals) or sine-based analog signals (e.g. audio based signals) that provide a minimal loss of signal characteristics at a very low data rate.

This object is achieved by way of a method for digital compression and digital expansion of linear or sine-based signals by determination of a signal coordination point in a bi-adaptive scaleable mV/step and a time/step structured plane. The method includes digitizing an analog input signal, detecting breaks of the digitized input signal, and determining a time difference and an amplitude difference of two successive breaks of the input signal. The time difference and the amplitude difference of successive breaks are value coded as a data word based on adaptive scaleable time-per-step tables and voltage-per-step tables, and the time-per-step tables and the voltage-per-step tables are selected depending on an absolute value of the time difference and amplitude difference determined so as to produce compressed data. Preferred embodiments of the invention, as well as a corresponding expansion method, are also claimed.

In an input signal compression method according to the invention, the input signal is digitized via an A/D converter, the breaks (maximum values or kinks in the signal) of the digitized input signal are detected, and the time difference and the amplitude difference of two successive breaks of the input signal are determined.

The time difference and the amplitude difference of successive breaks are value coded as a data word on the basis of scaleable time-per-step tables and scaleable voltage-per-step tables, with the time-per-step tables and the voltage-per-step tables being selectable depending on the absolute break position differences in the mV/step and time/step structured planes, resulting from the determined time differences and amplitude differences of the detected input signal breaks.

Thus, by using adaptive scaleable tables, depending on the time difference and associated amplitude difference, it is possible to build a two dimensional time-per-step and voltage-per-step structured plane for every successive break position of the input signal. Based on this procedure, the data rate of the input signal coding process can be dynamically adapted to the input signal frequency and the signal amplitude for every break-to-break distance.

As a consequence, the necessary memory for storing the compressed audio data will decrease. On the other hand, the input signal recording time at a given memory size will increase.

By way of the invention, it is possible to transfer mechanical sourced signals (linear based signals) that are particularly relevant to mechanical defect investigation of industrial machines (e.g. turbines, gears, analog sensors) as well as human vocal-based audio (sine-based signals).

These and other objects, aspects and embodiments of the present invention will be described in more detail with reference to the drawings.

DETAILED DESCRIPTION OF THE INVENTION

Analog Signal Coder

Figure 1:
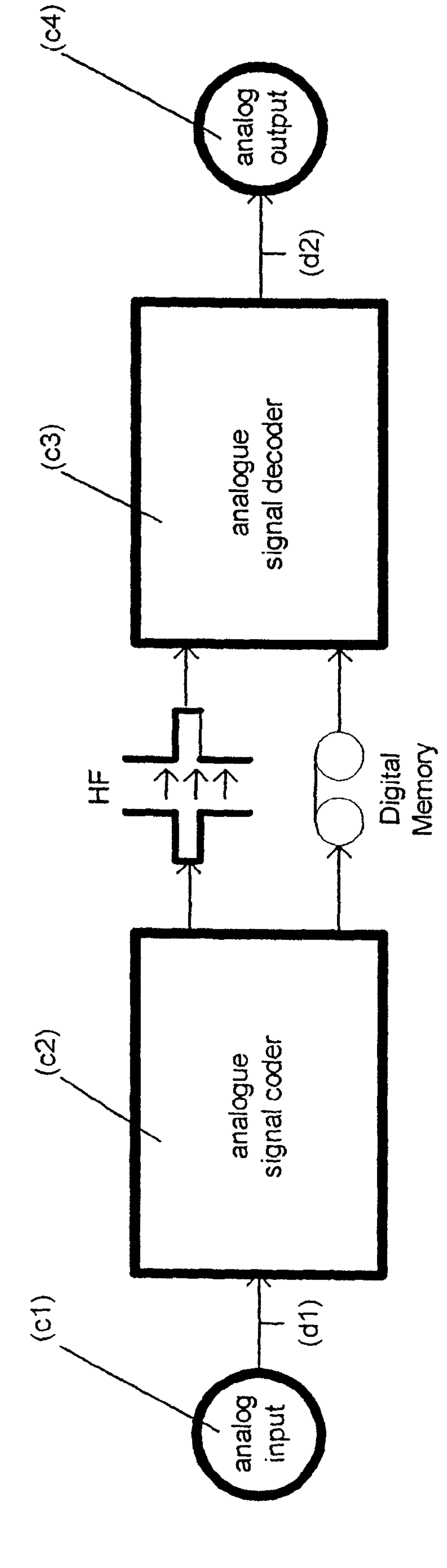
FIG. 1 is a block diagram of the general signal acquisition flow as described in the introductory part of this specification.
Figure 2A:
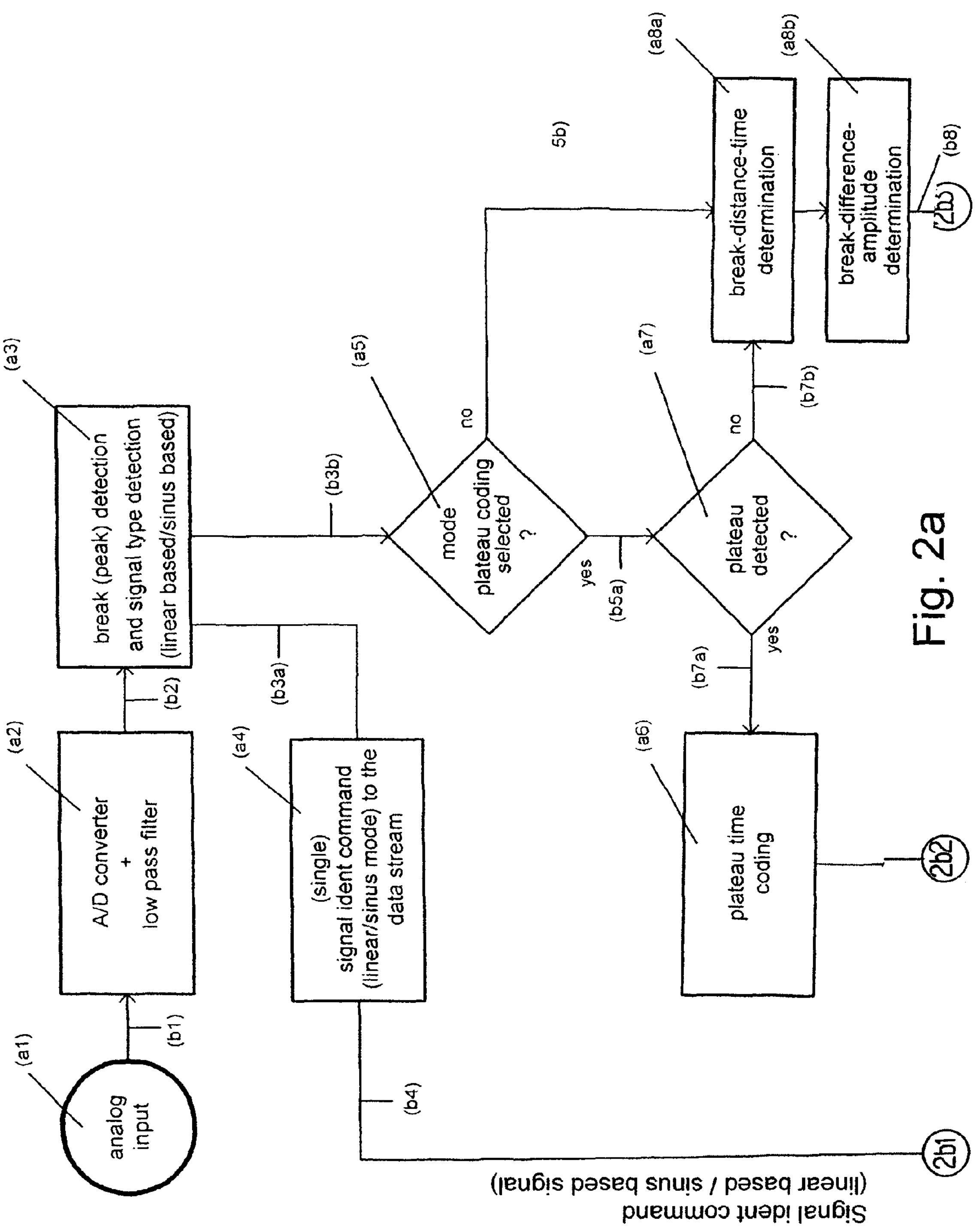
FIG. 2 is a functional flow diagram showing the data compression method according to the invention.
Figure 2B:
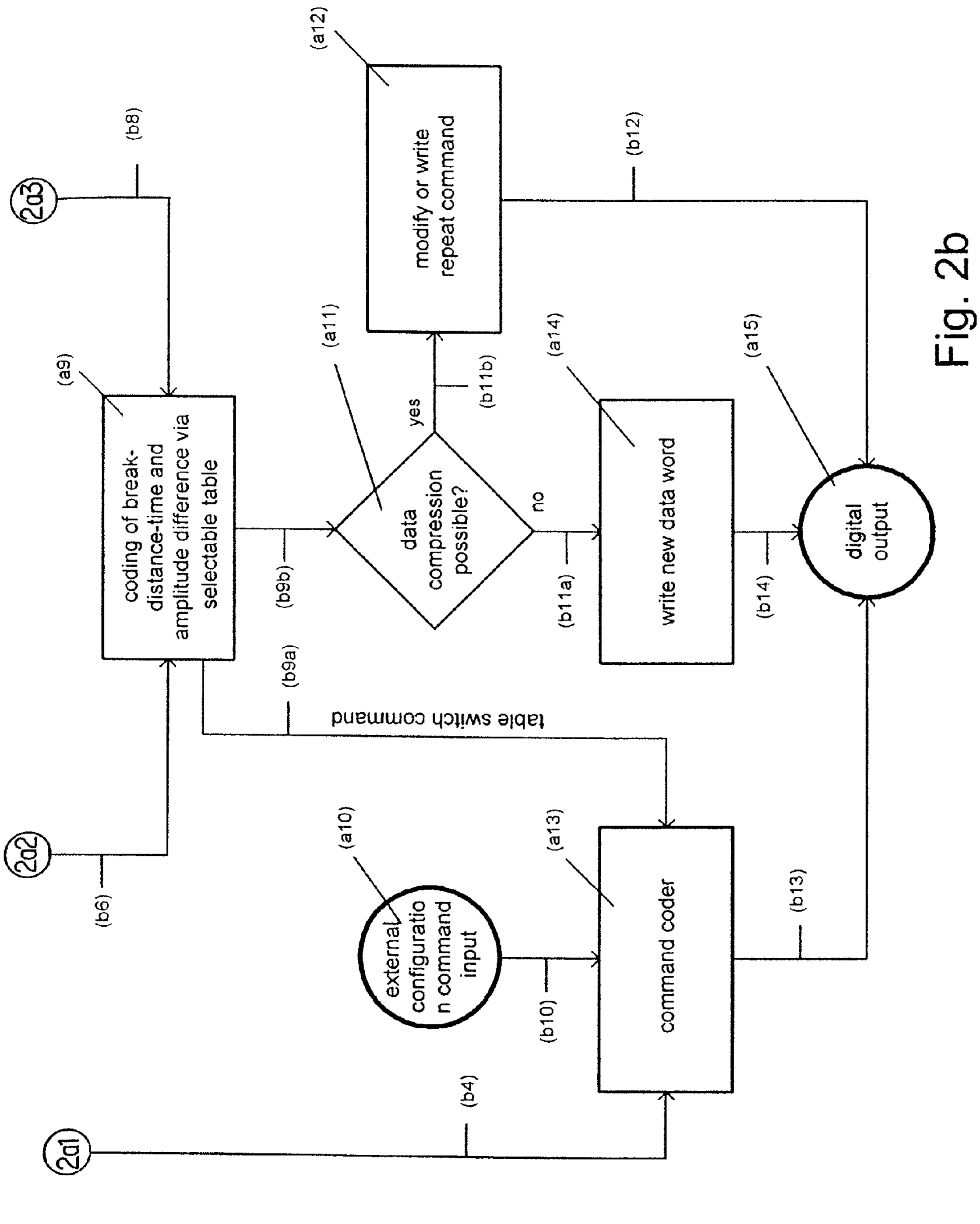

An analog signal coder using the compression method according to the invention converts a linear or sine-based signal from the analog input a1 (FIG. 2) to a digital data stream into the digital output a15 FIG. 2).

Break Detection

The input signal b1 (FIG. 2) is processed via a A/D analog to digital converter a2 (FIG. 2) and a low pass filter a2 (FIG. 2) to reduce frequencies above the frequency spectrum that is to be processed. The output b2 (FIG. 2) of the low pass filter is sent to a break detection unit a3 (FIG. 2).

Figure 3:
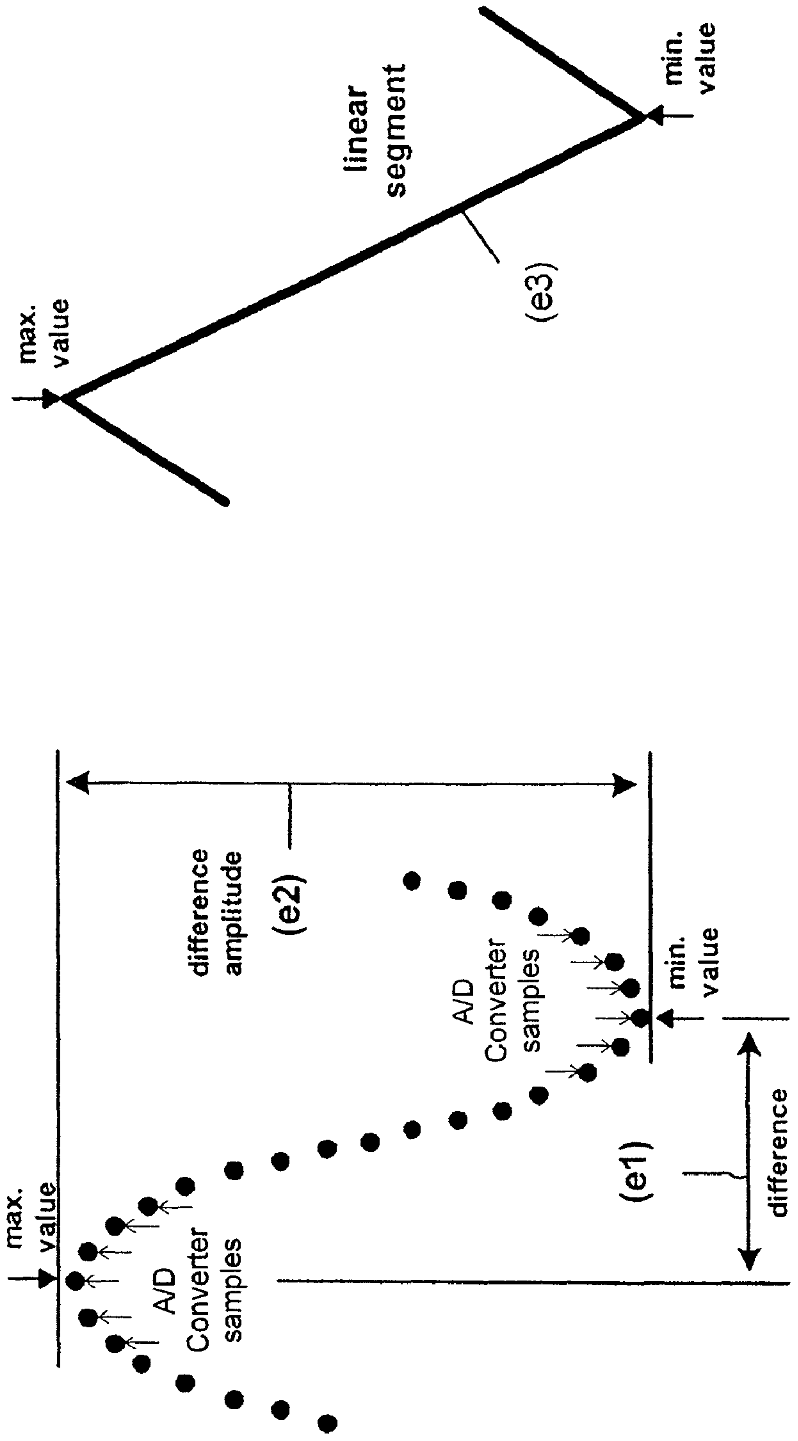
FIG. 3 is a schematic diagram regarding break detection according to the invention.
Figure 4:
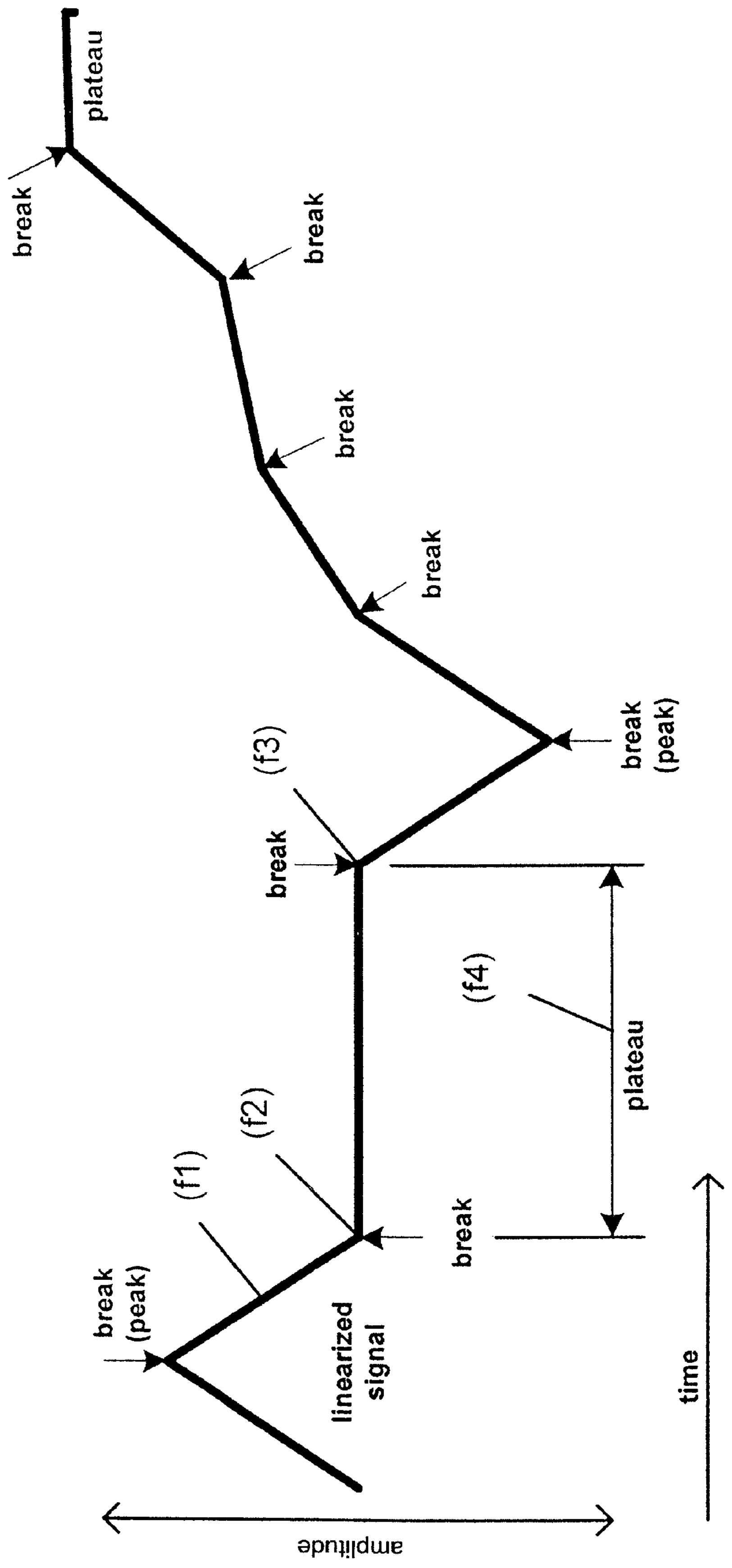
FIG. 4 is a schematic diagram regarding a combined plateau/break detection according to the invention.

A signal break according to the invention is defined as any signal direction change. Consequently, this definition covers not only local minimums or local maxima but also any kind of breaks combined with plateaus (see several examples shown in FIG. 4). The time difference e1 (FIG. 3) between two breaks is measured and the amplitude difference e2 (FIG. 3) between the same two breaks is measured. The break detection unit a3 (FIG. 2) will detect if the input signal has a linear or sine-based structure. The linear or sine-based signal condition information ('linear-based signal mode' or 'sine-based signal mode') a4 (FIG. 2) is sent, at b4 (FIG. 2), directly to the configuration command coder a13 (FIG. 2), which will send a signal-type identification command b13 (FIG. 2) into the digital output a15 (FIG. 2), i.e. a data stream.

After verification at a4 (FIG. 2) as to whether the input signal is linear based or sine-based, the subsequent processing of the digitized input signal at b3*b* (FIG. 2) will be identical for both types of signal types (i.e. linear based signals or sine-based signals).

The output of the break detection process at b3*b* (FIG. 2) that forms the basis for the further processing is a linear segment e3 (FIG. 3), marked by two absolute defined break positions.

Speech Gap Detection

Optionally, the process can enable or disable plateau coding. Hence, as a next step a5 FIG. 2), it is checked if the signal plateau detection was enabled or not.

If plateau coding is selected, it will be checked, a7 (FIG. 2), if two successive breaks f2, f3 (FIG. 4) of the linear signal b3 (FIG. 2), f1 (FIG. 4) are at the same analog amplitude level a7 (FIG. 2). If this is the case, the break-to-break time f4 (FIG. 4) will be prepared at a6 (FIG. 2) to be coded as a plateau b6 (FIG. 2).

Signal Compression/Coding

Figure 5:
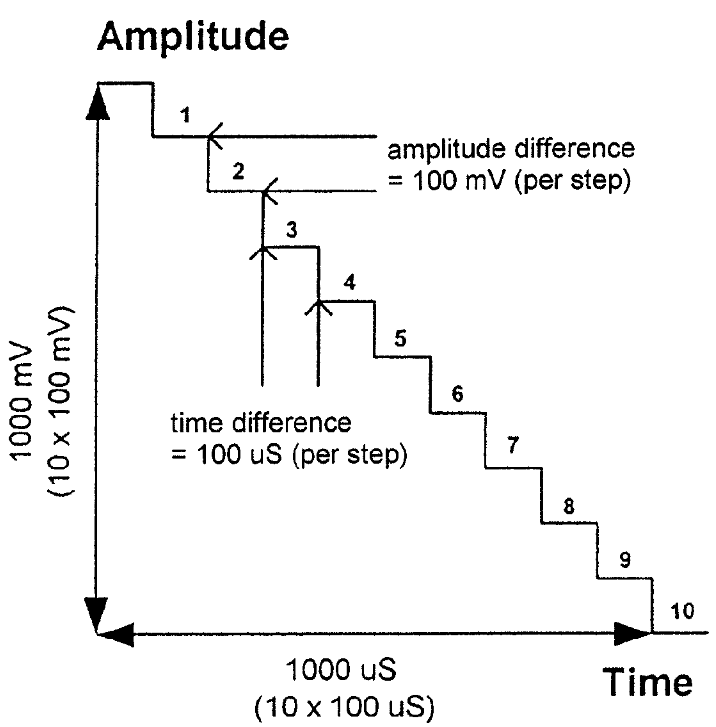
FIG. 5 shows examples of a time-per-step table and a voltage-per-step table.
Figure 6A:
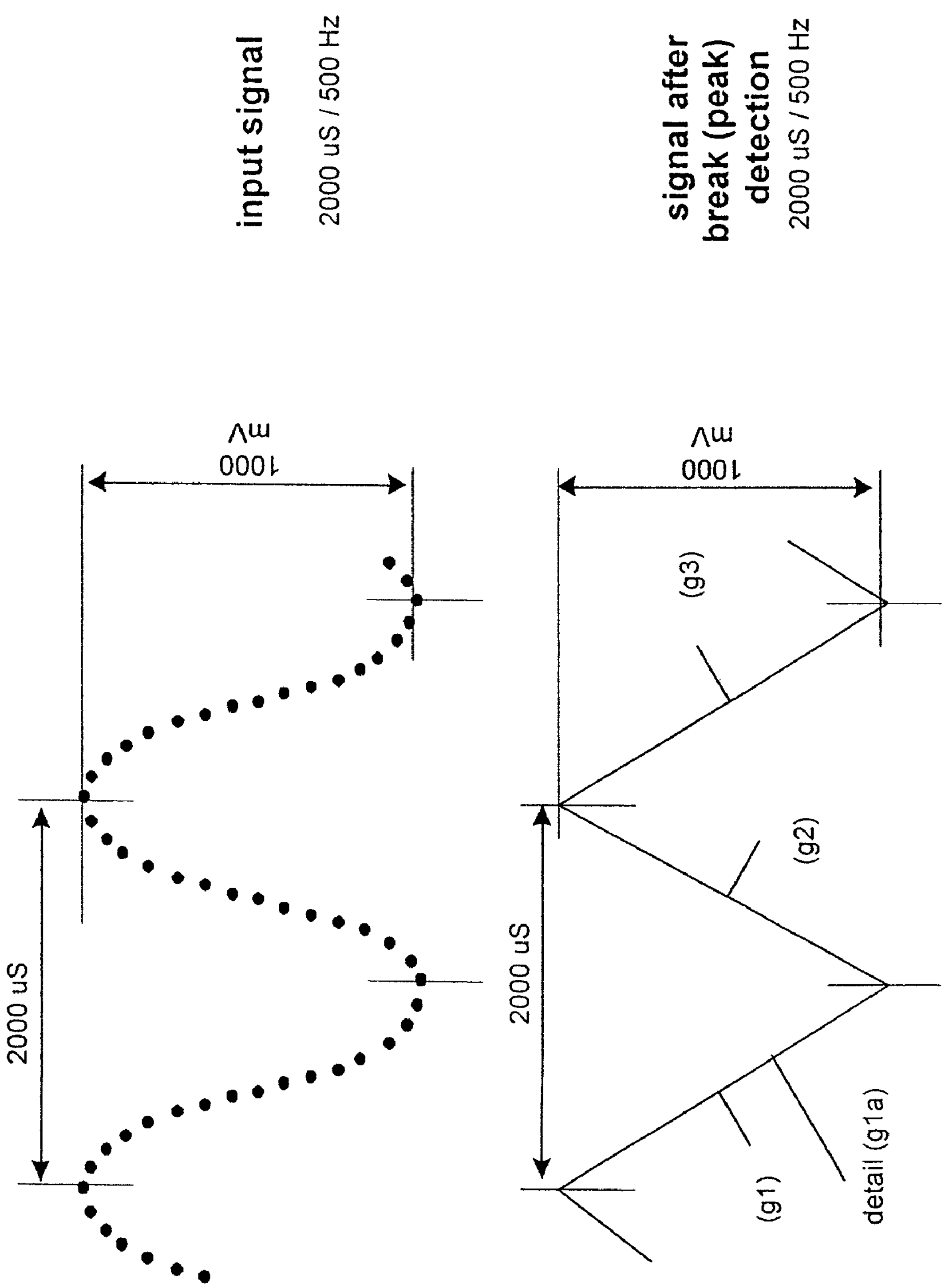
FIG. 6 is a schematic diagram showing digital code generation according to the invention with an analog input signal, a linear signal after break detection, and coded digital output.
Figure 6B:
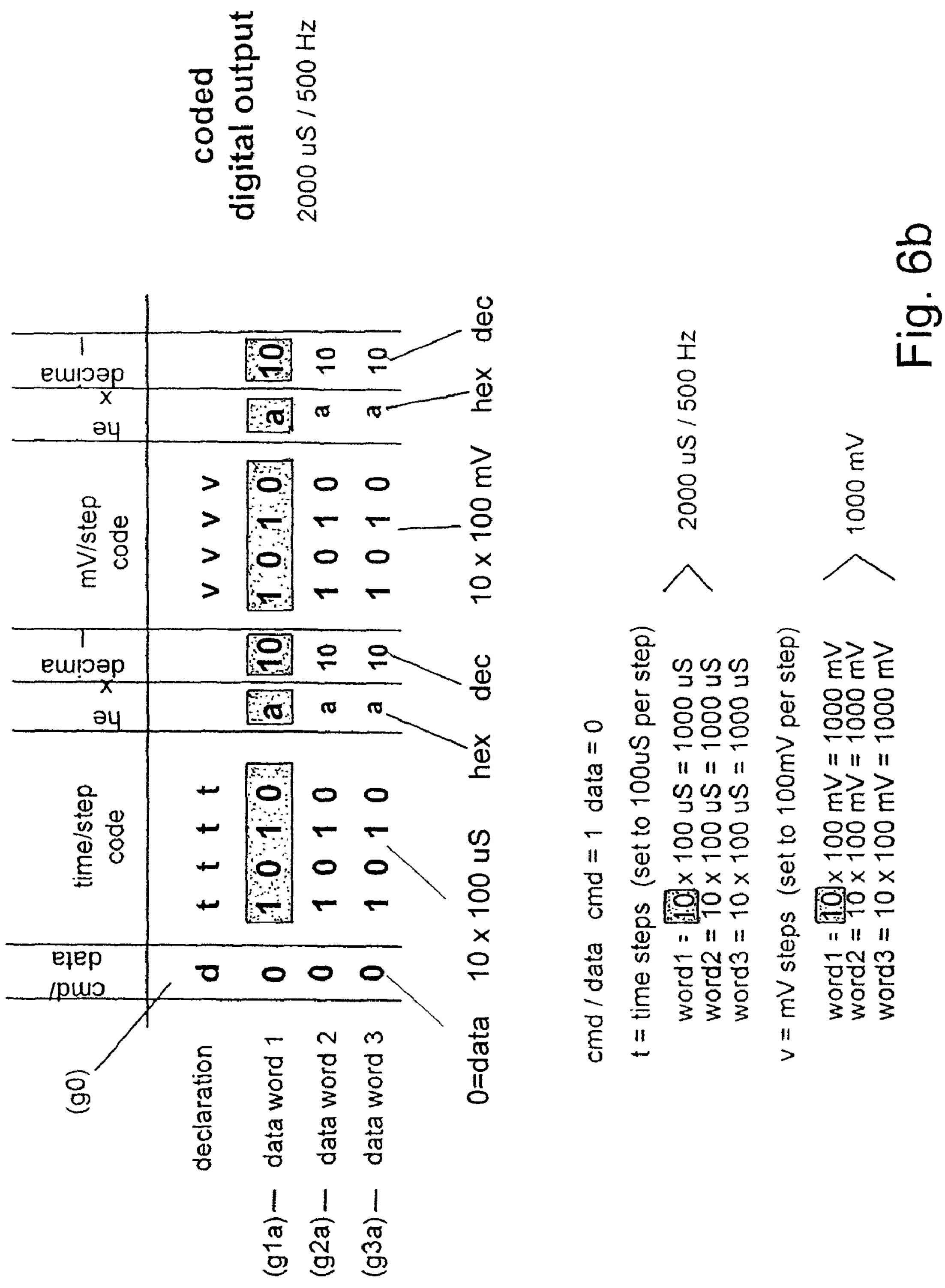
Figure 7:
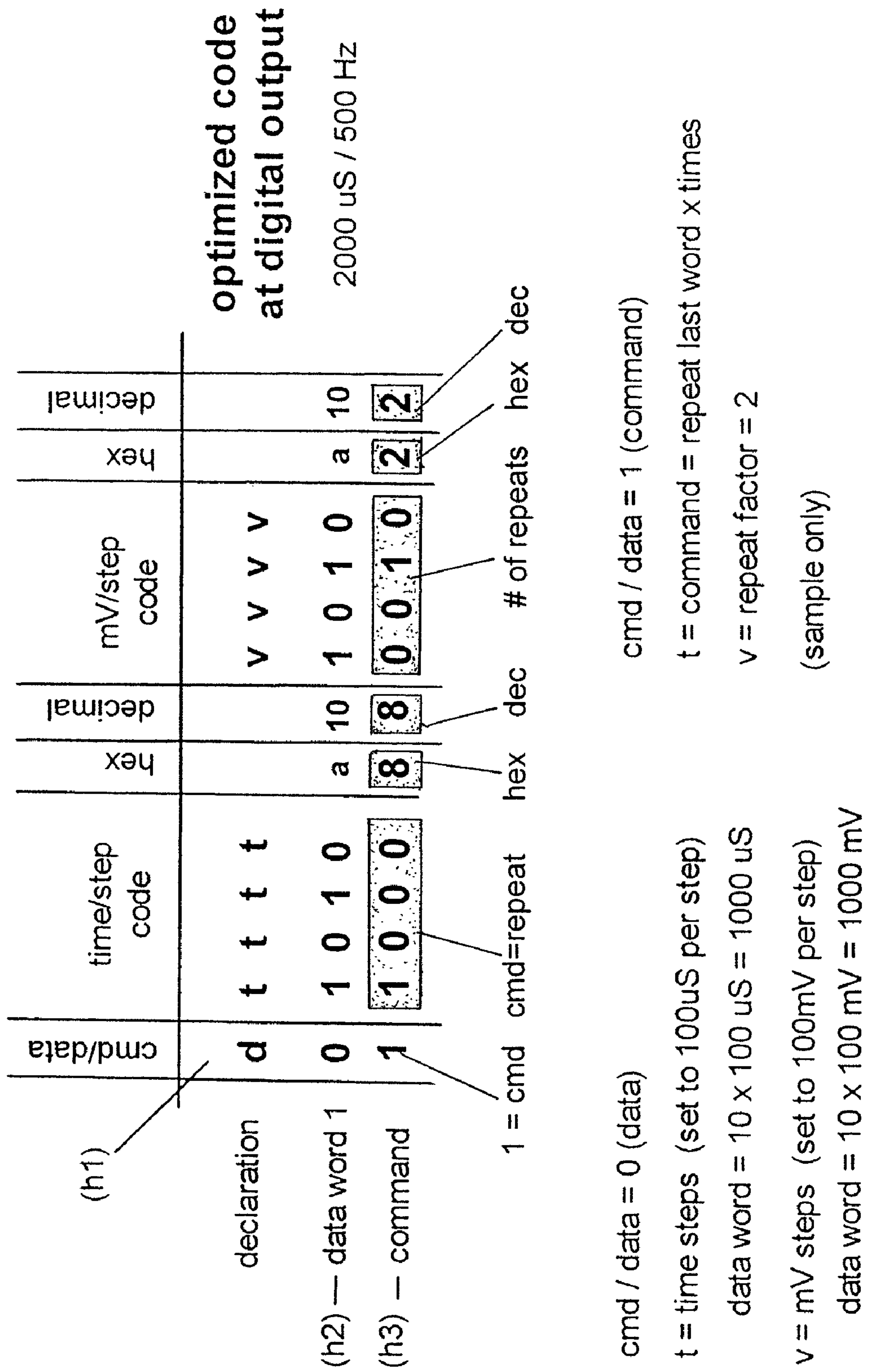
FIG. 7 is a schematic diagram showing optimized digital code generation based on the coded digital output according to the invention.

If no plateau signal applies, as at b7*b* (FIG. 2), or if no plateau coding is selected, as at b5*b* (FIG. 2), then the break-to-break times e1 (FIG. 3) and the break-to-break amplitudes e2 (FIG. 3) will be measured at a8*a*, a8*b* (FIG. 2) and value coded at a9 (FIG. 2), g1 (FIG. 6), g1*a* (FIG. 6) on the basis of an adaptive scaleable time-per-step table (see FIG. 5) and on the basis of a adaptive scaleable voltage-per-step table (see FIG. 5 again) into one data word, determined by the signal break point position in a bi-adaptive structured plane, as shown at g1*a*, g2*a*, and g3*a* in FIG. 6 (the data contained in the columns 'hex' and 'decimal' of FIGS. 6 and 7 show the coded data in decimal code and hex code respectively—these columns are provided for information purposes only and do not form part of the actual code). A scale change b9*a* (FIG. 2) of the time-per-step table or the voltage-per-step table will be done at a9 (FIG. 2) if the input signal can not be projected into the actual defined mV/step and a time/step structured plane (because of minimum or maximum value overrun).

On top of this generated data word, one control bit (for switching between command and data) g0 (FIG. 6), b9*b* (FIG. 2) will be inserted into the data stream. In FIG. 5, examples of a time-per-step table and a voltage-per-step table are shown. The sample time-per-step table of FIG. 5 consists of 16 steps with increments of 100 μs.

The voltage-per-step table of FIG. 5 consists of 16 steps with increments of 100 mV. Hence, by way of example, a linear segment (shown on the left hand side of FIG. 5), having a time difference of 1000 μs=10×100 μs and a voltage difference of 1000 mV=10*100 mV, will be coded in the format shown in FIG. 6—see the data words g1*a*, g2*a*, and g3*a* (FIG. 6). Each data word has a leading control bit g0 (FIG. 6) indicating that the data word is either a data word (0) or a command word (1). With the mV/step and the time/step tables shown in FIG. 5, a maximum value of 1600 mV or 1600 μs, respectively, can be coded. For values beyond 1600 mV or 1600 μs, or considerably smaller than 100 mV or 100 μs, a different mV/step and a different time/step table, having other adaptive increments, will be selected. As a consequence the data rate is dynamically adapted to the frequency of the analog input signal to be coded.

Code Optimizing

The currently generated break position vector code b9*b* (FIG. 2) will be checked at all (FIG. 2) against the previous break position vector code a15 FIG. 2) to identify identical break position vectors (the vector code contains no absolute value information and therefore the compression can be done very simply), as is the case in the example according to FIG. 6 (three consecutive identical data words g1*a*, g2*a*, g3*a*). As long as identical information is detected at b11*b* (FIG. 2), a 'repeat last data word' command word b12 (FIG. 2), h3 (FIG. 7) will be modified or written at a12 (FIG. 2) instead of the data word itself.

FIG. 7 shows the constitution of such a 'repeat last data word' command word h3 in detail. The first part (high nibble) '1000' coded in hex-code generally indicates the type of command word (in this case a 'repeat last data word' command word). The second part (low nibble) '0010' also coded in hex code indicates a repeat factor, i.e. the number of times the previous data word h2 (FIG. 7) should be repeated (in the present case, two times)

Setup Configuration

The set up and configuration after power-on and the input of date, time and channel information (e.g. sensor number or dedicated analog signal input channel) into the digital output a15 (FIG. 2) is done via the command coder a13 (FIG. 2), b13 (FIG. 2) controlled by the configuration command input a10 (FIG. 2), b10 (FIG. 2).

Signal Decoder

In order to reconstruct the original analog signal from the coded linear or sine-based signal, the following decoding process may be applied.

Figure 8A:
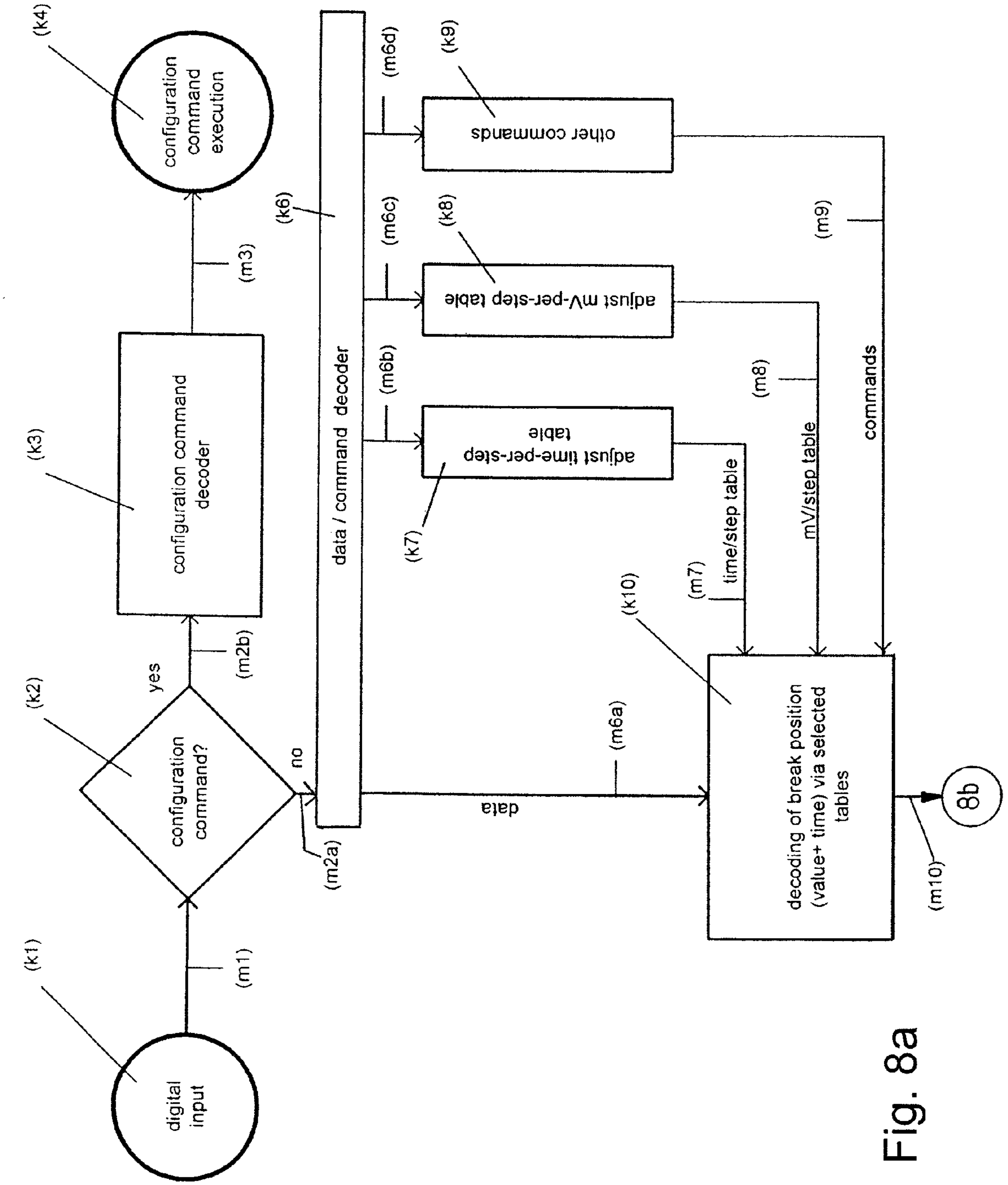
FIG. 8 is a functional flow diagram showing the data expansion method according to the invention.
Figure 8B:
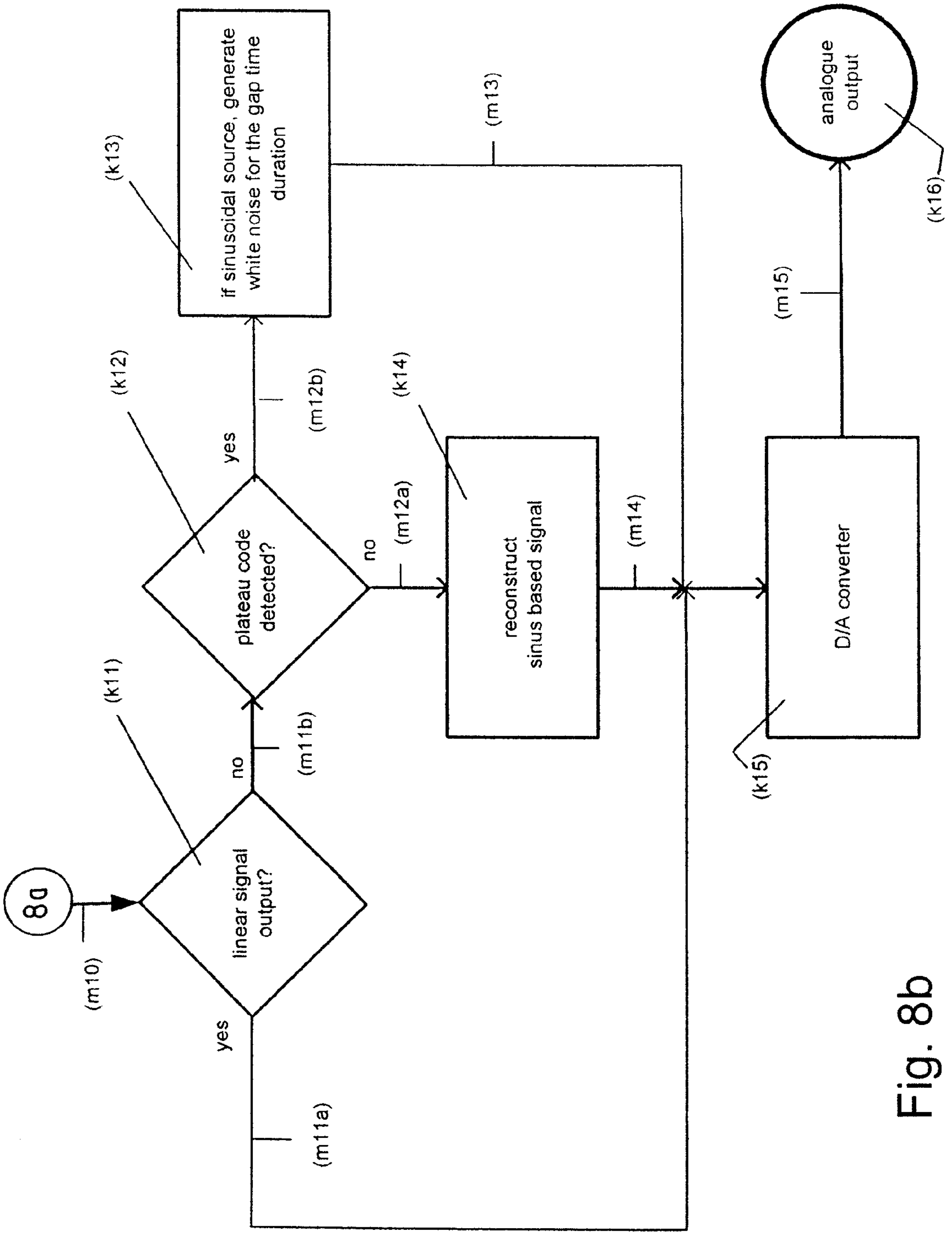

A functional flow diagram of the recorded or transmitted coded digital data decoding process is shown in FIG. 8. The decoder will convert the coded data words from the digital input k1 (FIG. 8) into a linear based or sine-based output signal k16 (FIG. 8).

Decoding Setup Configuration

The input signal m1 (FIG. 8) from the digital input k1 (FIG. 8) is checked at k2 (FIG. 8) for configuration of power-on set up and date, time, and channel information (e.g. sensor number or dedicated signal input channel). The configuration commands will be decoded at m2*b* (FIG. 8) in the configuration command decoder k3 (FIG. 8) and will be directly transferred at m3 (FIG. 8) to the configuration command execution output k4 (FIG. 8).

Decoding of (Signal Specific) Commands

The data and command decoder k6 (FIG. 8) separates the incoming data stream m2*a* (FIG. 8) into either signal data m6*a* or mV/step and time/step table commands m6*b*, m6*c* or other commands m6*d*. Controlled by the command decoder k6, the units k7, k8 and k9 control the selection of the time table (k7: time-per-step) and the value table (k8: voltage-per-step), and may control additional signal control commands (k9: e.g. plateau information). The table output m7, m8, or m9 is used at k10 to reconstruct the original linear or sine-based data (e.g. audio or other signal types).

Decoding of Signals

Figure 9A:
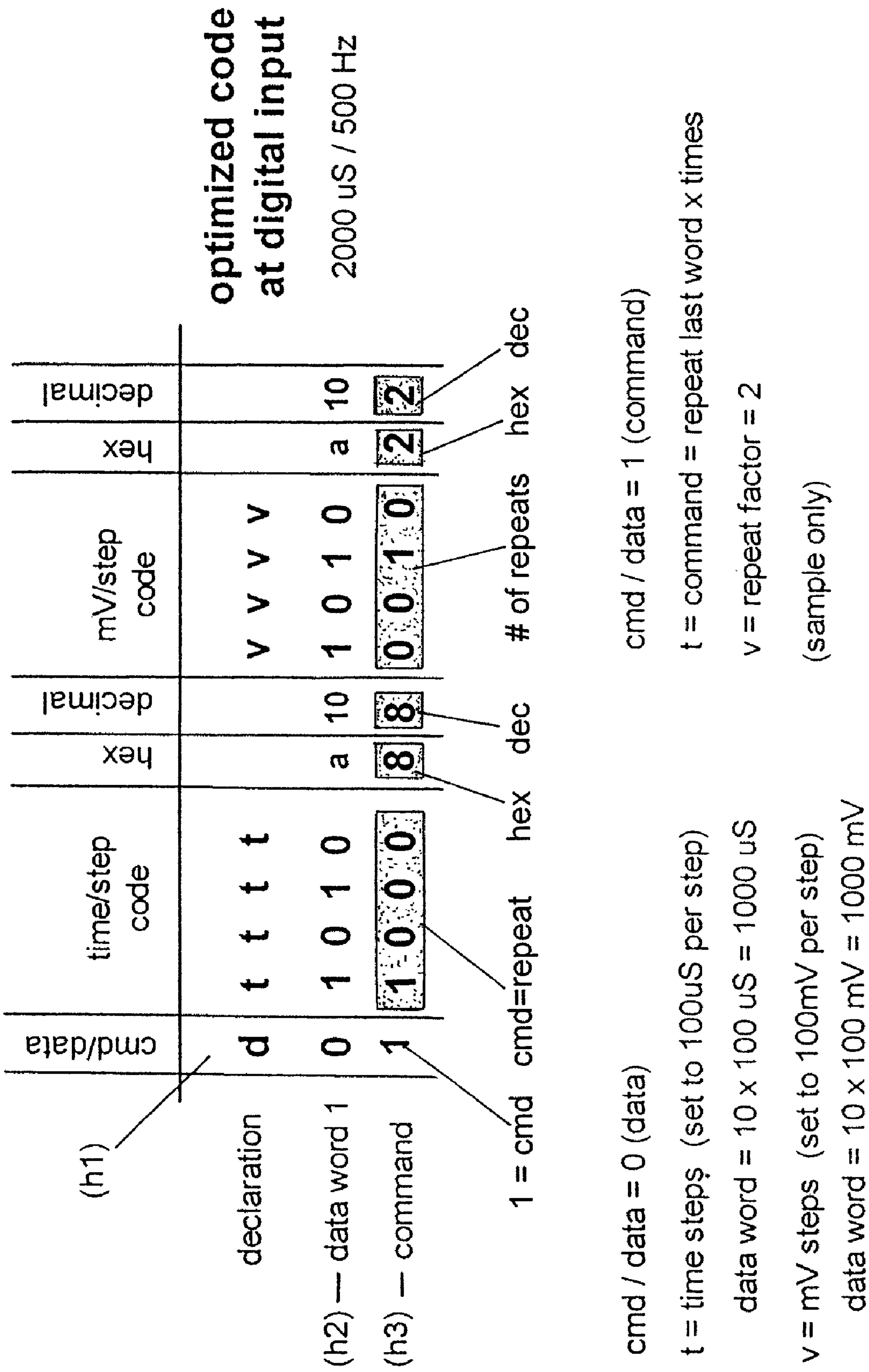
FIG. 9 is a schematic diagram showing reconstruction of the linear based digital signal code according to the invention.
Figure 9B:
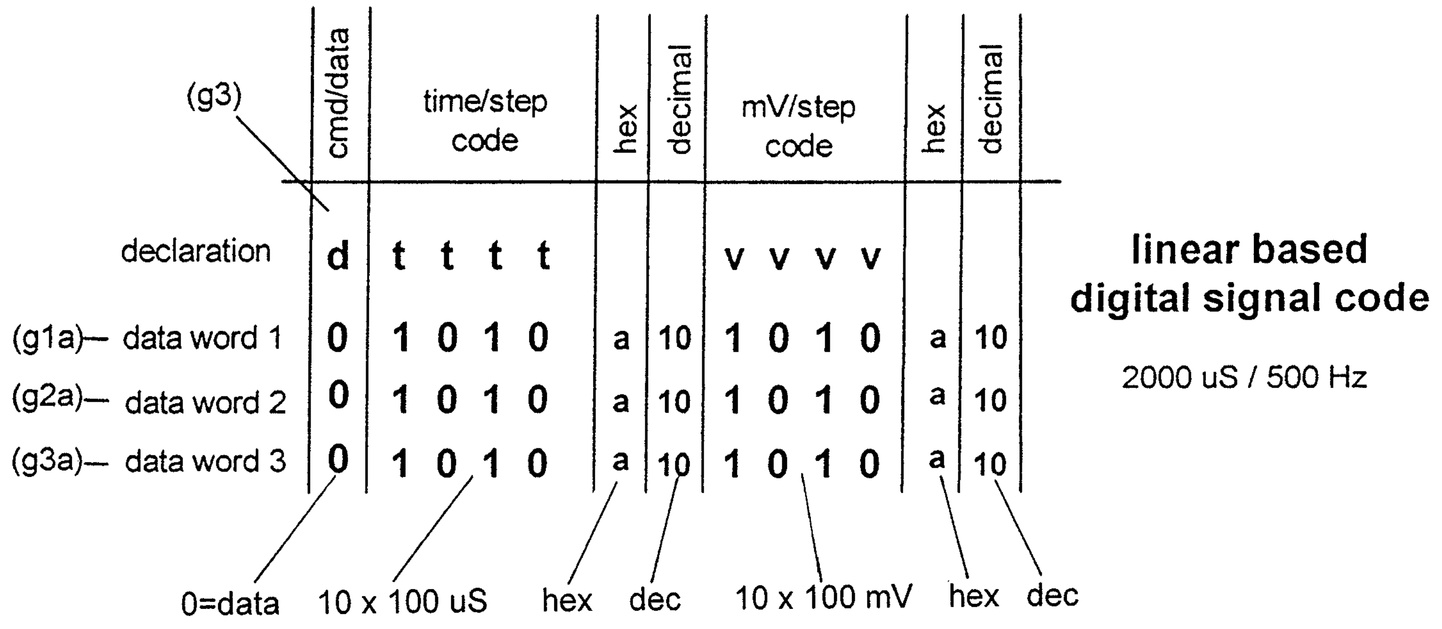

The decoding of the digital input code is done k10 (FIG. 8) by expanding the optimized code represented in FIG. 9*a* (i.e. containing 'repeat last data word' command words) to not optimized (expanded) linear based digital signal code n1 (FIGS. 9*b* and 10) consisting of break time differences and break amplitude differences. The optimized code shown in FIG. 9*a* corresponds to FIG. 7. By using the information of the 'repeat last data word' command word h3 (FIG. 9*a*), the expanded code of FIG. 9*b*, consisting of three identical consecutive data words, is generated. The expanded code shown in FIG. 9*b* corresponds to FIG. 6.

Figure 10B:
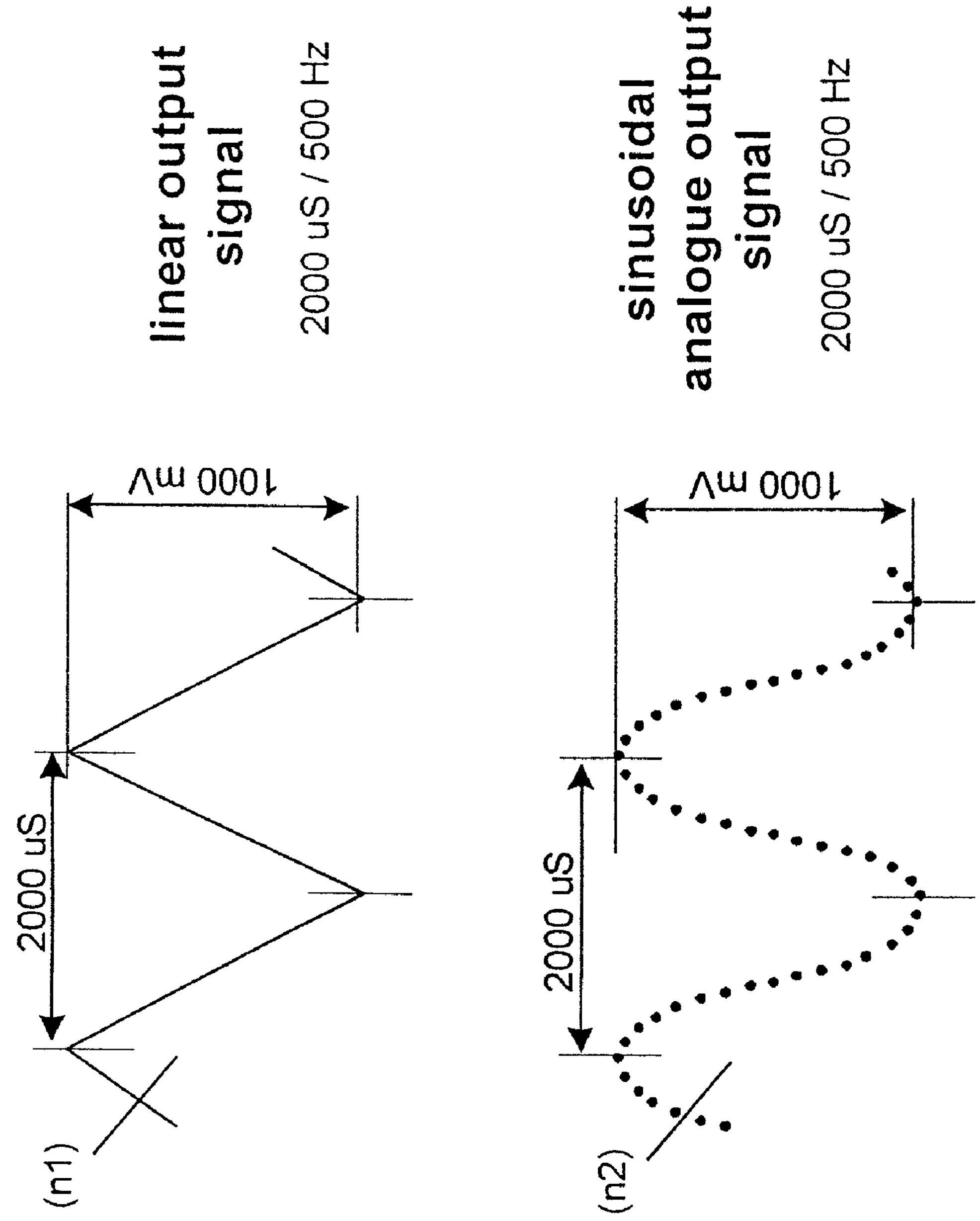
FIG. 10 is a schematic diagram showing reconstruction of the original analog signal according to the invention with a linear based digital signal code, a linear based output signal, and a sine-based output signal.

The linear based code (FIG. 9*b*) is expanded at k10 (FIG. 8) by decoding of break positions via the selected time-per-step table and voltage-per-step table used for the coding of the original analog input signal. The result of this expansion process is a linearized signal n1 (FIG. 10). If a linear output signal is required as n1 (FIG. 10) or k11 (FIG. 8), the output from the decoding of break (peak) position function m10 (FIG. 8) can be directly forwarded at m11*a* (FIG. 8) via the D/A converter k15 to the output k16.

For a sine-based output signal n2 (FIG. 10), the linear output code m10 (FIG. 8) from the decoding of break position k10 (FIG. 8), function will be checked for plateau data words k12 (FIG. 8). If plateaus are detected at m12*b* (FIG. 8), the plateau time must be recreated and filled with white noise at k13 (in order to improve the ear adaptation time) and transferred at m13 to the D/A converter k15.

Sine-based coded data m12*a* will be reconstructed at k14 to sine-based analog signal n2 (FIG. 10) by laying a cosine function over each linear break-to-break segment g1, g2 and g3 (FIG. 6), and n1 (FIG. 10). The analog output k16 (FIG. 8) is driven by a D/A digital to analog converter k15 (FIG. 8).

FIG. 11 shows sine-based sample diagrams generated by the compression and expansion methods according to the invention.

Figure 11A:
FIG. 11 shows analog signal sample diagrams generated by compression and expansion methods according to the invention.

FIG. 11*a* shows an unfiltered (true) sine-based input sample as the input signal of the compression process.

Figure 11B:
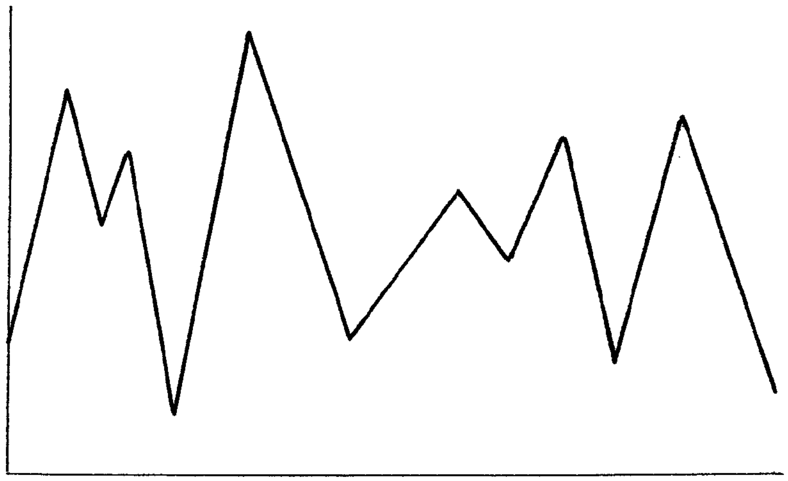

FIG. 11*b* shows the filtered and linearized sine-based signal generated from the signal of FIG. 11*a*.

Figure 11C:
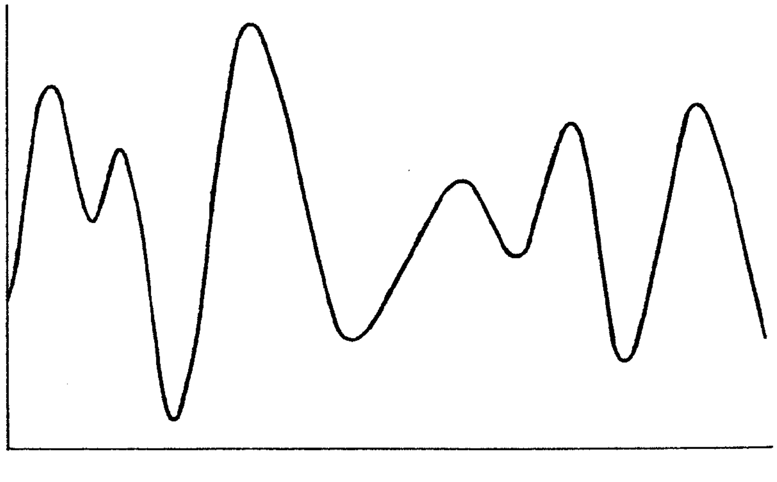

FIG. 11*c* shows the reconstructed sine-based analog signal as the output signal of the expansion process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An audio signal compression method, comprising:

digitizing an audio input signal, checking whether the audio input signal is linear-based or sine-based, detecting all peaks of the digitized audio input signal, determining a time difference and an amplitude difference of successive peaks for all pairs of successive peaks of the digitized audio input signal, value coding the time difference and the amplitude difference of all successive peaks as a data word based on selectable time-per-step tables and voltage-per-step tables, and selecting the time-per-step tables and the voltage-per-step tables depending on an absolute value of the time difference and amplitude difference determined so as to produce compressed data.

2. The method according to claim 1, wherein the audio input signal is checked to determine if signal levels at two successive peaks are the same, and wherein the time difference between the two successive peaks is coded as gap information when the signal levels at the two successive peaks are the same.

3. The method according to claim 2, wherein a value-coded data word is compared with a previous value-coded data word, and wherein a repeat command word, instead of a data word, indicating how many identical successive break position vectors were detected is generated when identical successive value-coded data words are detected.

4. The method according to claim 3, wherein compressed data are expanded using the selectable time-per-step tables and voltage-per-step tables.

5. The method according to claim 4, wherein the compressed data are expanded using the coded gap information.

6. The method according to claim 4, wherein the compressed data are expanded using the repeat command word.

7. The method according to claim 4, wherein a sine-based analog signal is reconstructed by fitting a cosine function to a reconstructed linear audio signal.

* * * * *